Feb. 22, 1944.  L. JACOBI  2,342,105
POWER TRANSMITTING MECHANISM
Original Filed Sept. 26, 1941
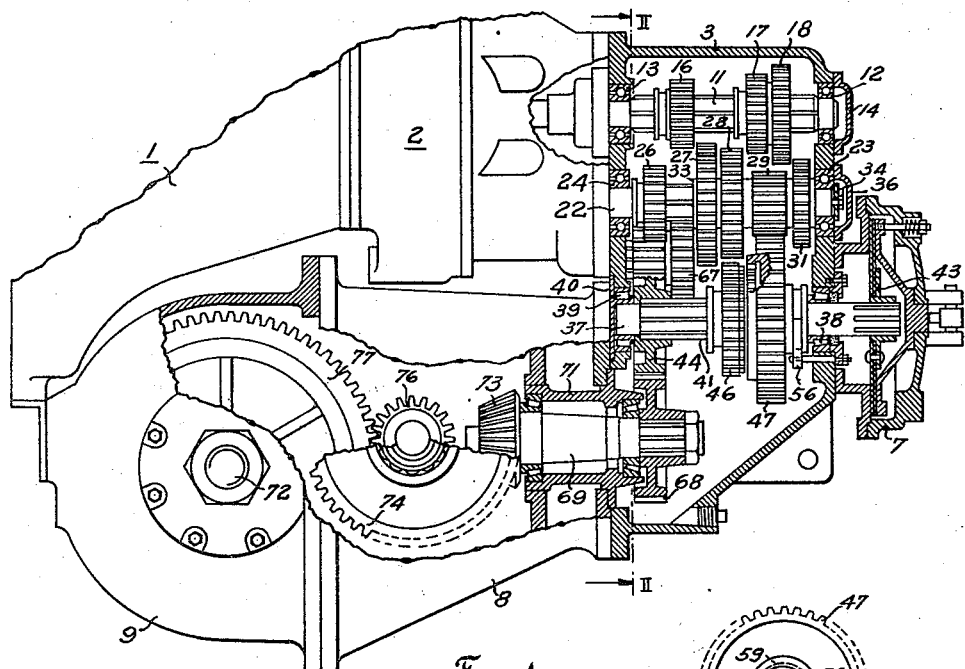
Fig. 1
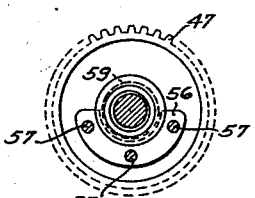
Fig. 4
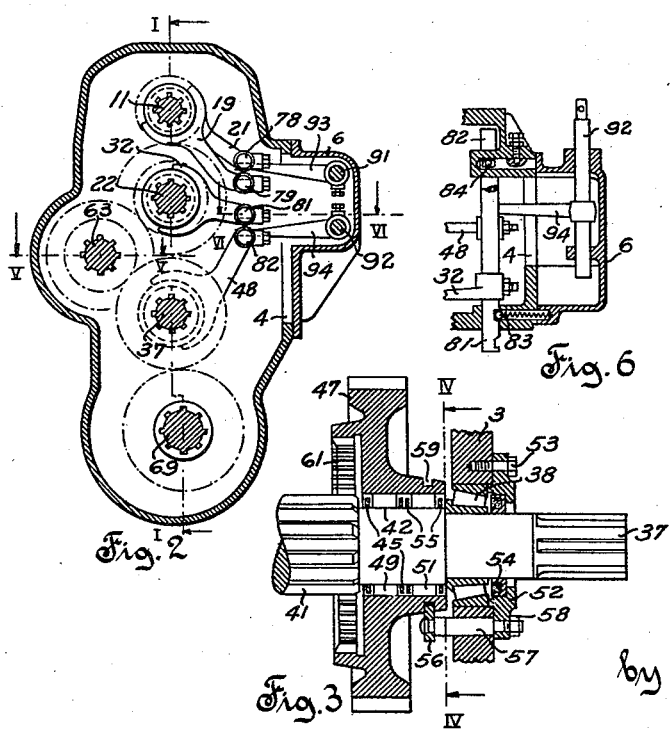
Inventor
L. Jacobi
by W. Bierwirth
Attorney Patented Feb. 22, 1944

2,342,105

UNITED STATES PATENT OFFICE 2,342,105

POWER TRANSMITTING MECHANISM

Louis Jacobi, West Allis, Wis., assignor to Allis-Chalmers Manufacturing Company, Milwaukee, Wis., a corporation of Delaware Original application September 26, 1941, Serial No. 412,361. Divided and this application April 9, 1942, Serial No. 438,262

5 Claims. (Cl. 74—606)

The present application is a division of application Serial No. 412,361, filed September 26, 1941, for Transmission, and the invention disclosed and claimed herein, although applicable elsewhere, is particularly adapted to facilitate assembly and disassembly of the transmission shown in the parent application.

The transmission which is the subject of the parent application has separate openings in its housing, one of relatively large size through which certain power transmitting gears may be moved into and out of the housing, and another of relatively small size through which a shaft may be moved axially for assembly with and disassembly from the gears within the housing. In the assembled transmission the shaft is rotatably supported on the housing in axially fixed position, and one of the gears has a circumferentially loose supporting connection with the shaft to permit rotation of said one gear relative to the shaft, while another of the gears has a circumferentially fixed supporting connection with the shaft to prevent rotation of said other gear relative to the shaft. In the assembled transmission the circumferentially loose gear is further secured against axial shifting movement relative to the housing while the circumferentially fixed gear is axially shiftable relative to the housing.

It is an object of the present invention to provide an improved power transmitting mechanism having a housing, a pair of rotary power transmitting elements and a shaft arranged relative to each other in the manner mentioned hereinbefore, and in which the circumferentially loose and fixed power transmitting elements may be assembled with and disassembled from the shaft by axial movement of the latter through the relatively small opening of the housing.

More specifically, it is an object of the invention to provide an improved mounting for the circumferentially loose and axially non-shiftable power transmitting element. The improved mounting, as contemplated by the invention, involves a novel manner of securing the circumferentially loose and axially non-shiftable element against axial displacement relative to the housing, which makes it possible to assemble the mentioned element and the shaft within the housing, and to disassemble the element and shaft, in a simple and convenient manner by axial movement of the shaft. The invention further contemplates to sustain the circumferentially loose and axially non-shiftable element, after withdrawal of the shaft, in substantially the same position relative to the housing, in which said element is supported on the shaft in the assembled transmission. The purpose of the last mentioned feature of the improved mounting is to hold the circumferentially loose and axially non-shiftable element within the housing, preparatory to insertion of the shaft, in a predetermined position in which it may be readily assembled with the shaft by axial movement of the latter.

A further object of the invention is to provide an arrangement for restraining the circumferentially loose and axially non-shiftable element from axial movement relative to the housing independently of the shaft, and for holding it in the mentioned predetermined position, which arrangement is such as to permit ready installation of the element in said predetermined position preparatory to insertion of the shaft, and ready removal of the element from said position and from the housing after withdrawal of the shaft.

A still further object of the invention is to incorporate the mentioned features of the improved mounting for the circumferentially loose and axially non-shiftable element in a construction which is simple and compact in design, efficient in operation, and which requires no expensive parts or relatively high manufacturing costs in order to serve its intended purposes in an entirely satisfactory manner.

The foregoing and other objects and advantages of the invention will become more fully apparent from the following description of a preferred embodiment of the invention shown in the accompanying drawing. Referring to the drawing, in which like reference characters designate the same or similar parts in the several views:

Fig. 1 is a side view of a transmission and associated drive mechanism for a motor grader, the transmission being shown in section on line I—I of Fig. 2;

Fig. 2 is a sectional view on line II—II of Fig. 1;

Fig. 3 is an enlarged sectional view of a detail of the transmission shown in Fig. 1;

Fig. 4 is a view on line IV—IV of Fig. 3;

Fig. 5 is a sectional view on line V—V of Fig. 2; and

Fig. 6 is a sectional view on line VI—VI of Fig. 2.

As has been mentioned in connection with Fig. 1, the transmission and associated parts shown in this figure are intended for use in a motor grader, and part of the internal combustion engine of the grader is generally indicated by the reference character 1. A clutch housing 2 is shown as being secured to the forward end of the engine 1, and secured to the forward end of the clutch housing 2 is a transmission housing 3 which has straight front and rear walls, as shown in Fig. 1, and somewhat irregular top, bottom and side walls, as shown in Fig. 2. A relatively large opening 4 in one of the side walls is covered by a cap housing 6, and secured to the front wall of the transmission housing 3 is a brake housing 7. The transmission housing 3 has an upper portion opposite to the clutch housing 2 and a downwardly extending lower portion, to the rear wall of which is secured a gear housing 8 underlying the clutch housing 2, and an axle housing 9 is secured to the rear of the gear housing 8.

Mounted in the upper portion of the transmission housing 3 is a splined driving shaft 11 which is rotatably supported at its opposite ends in alined openings of the front and rear walls of the transmission housing 3 by ball bearings 12 and 13, respectively. The front opening for the bearing 12 is closed by a detachable cover 14, and the shaft 11 extends through the bearing 13 into the clutch housing 2, suitable clutch mechanism, not shown, being enclosed within the clutch housing for coupling the driving shaft 11 with the crankshaft of the engine 1 and for uncoupling it therefrom. Driving gears 16, 17 and 18 of successively increased diameters are arranged coaxially with the driving shaft 11 and have internal splines cooperating with the splines of the driving shaft so that they will rotate in unison with the latter but may be shifted axially thereof. The gear 16 has a grooved collar for engagement by a shifter fork 19, shown in Fig. 2, and the gears 17 and 18 are connected together to form a gear cluster which has a grooved collar for engagement by a shifter fork 21 shown in Fig. 2.

A lay shaft 22 directly below the driving shaft 11 is rotatably supported at its opposite ends in alined openings of the front and rear walls of the transmission housing 3 by means of ball bearings 23 and 24, respectively. The portion of the lay shaft 22 between the bearings 23 and 24 has longitudinal splines extending throughout the length of said shaft between its bearings, and alined on the splined portion of the lay shaft are five gears indicated by the reference characters 26, 27, 28, 29 and 31, respectively. The gear 26 has internal splines cooperating with the splines of the lay shaft 22 so that the gear 26 may rotate in unison therewith but may be shifted axially thereof. A grooved collar on the gear 26 is engaged by a shifter fork 32 shown in Fig. 2. The gears 27, 28, 29 and 31 are separately formed and are each provided with internal splines cooperating with the splines of the lay shaft so that they will rotate in unison therewith. The hub of the gear 27 abuts against a snap ring 33 axially fixed on the shaft 22 at the side of the gear 27 facing the gear 26, and the hub of the gear 31 abuts against the inner race of the ball bearing 23. The relatively adjacent faces of the hubs of the gears 27, 28, of the gears 28, 29, and of the gears 29 and 31 abut each other, and the entire row of gears 27, 28, 29 and 31 is compressed between the snap ring 33 and the inner race of the bearing 23 by means of a screw and washer 34 at the forward end of the shaft 22. The bearing opening for the shaft 22 in the front wall of the transmission housing, and the screw and washer 34 are covered by a detachable cap 36.

The gears 26, 27, 28, 29 and 31 form a series of drivingly interconnected gears which are rotatably mounted in radially offset positions relative to the driving shaft 11, and to which series rotation of the driving shaft may be transmitted at different speed ratios, a first, or low speed ratio being afforded by mesh of the gear 16 with the gear 27; a second, or intermediate speed ratio being afforded by mesh of the gear 17 with the gear 28; and a third, or high speed ratio being afforded by mesh of the gear 18 with the gear 31.

A driven shaft 37 is rotatably mounted on the housing 3 by means of a pair of conical roller bearings 38 and 39, the roller bearing 38 being detachably mounted in a bearing opening of the front wall of the housing 3, and the roller bearing 39 being mounted in the rear wall of the housing 3, as described in fuller detail hereinbelow. As shown in Fig. 3, the shaft 37 has a splined section 41 and a cylindrical section 42 within the housing 3, the diameter of the cylindrical shaft section being smaller than the outside diameter of the splined section. That is, the shaft 37 has a shoulder within the housing 3 between a portion thereof adjacent to the opening for the bearing 38, and a radially enlarged portion of the shaft remote from said bearing opening. The diameter of said bearing opening is just large enough to accommodate the outer race of the roller bearing 38, the cylindrical surface of the housing opening being frictionally engaged by the cylindrical outer surface of the outer race, and the latter being movable axially into and out of the housing opening under moderate pressure. Referring to Fig. 1, the outer race of the rearward bearing 39 is similarly fitted into a cylindrical opening in the rear wall of the housing 3. A cover 40 secured to the housing 3 between its rear wall and the gear housing 8 affords an abutment for the outer race of the bearing 39 to prevent rearward displacement of the outer race of the latter bearing relative to the housing.

The driven shaft 37 extends through the bearing 38 into the brake housing 7, and a friction disk 43 forming part of a transmission brake mechanism for the grader is secured to the splined forward end of the driven shaft 37 for rotation therewith within the brake housing 7.

A pair of rotary power transmitting elements in the form of gears 46 and 47 are mounted on the shaft 37 within the lower portion of the housing 3, the gear 47 being arranged to permanently mesh with the gear 29, and the gear 46 being axially movable into and out of mesh with the gear 27. The gear 47 has a hub, as more clearly shown in Fig. 3, and a cylindrical axial bore through the hub, while the gear 46 has a broached axial opening extending through its center, the broached axial opening of the gear 46 being formed in the usual manner by forcing a broaching tool through an axial bore of the gear so as to form an internal circumferential series of axially extending splines therein. The shaft 37 has a first supporting connection with the gear 47 within the mentioned cylindrical axial bore of the hub of said gear, and a second supporting connection with the gear 46 within the mentioned broached opening of the latter gear. The first supporting connection is formed, as shown in Fig. 3, by two roller units, one comprising a series of cylindrical rollers 49 and a pair of guide rings 45, and the other comprising a series of cylindrical rollers 51 and a pair of guide rings 55. Both series of rollers cooperate directly with the axial surface of the radially reduced cylindrical portion 42 of the shaft 37 and with the axial surface of the bore of the gear 47 to rotatably support and center the gear 47 on the shaft 37. The first supporting connection provided by the cylindrical rollers 49 and 51 is circumferentially loose to permit rotation of the gear 47 relative to the shaft, but it is ineffective to secure the gear 47 in axially fixed position on the shaft 37. The second supporting connection is provided by the external splines of the shaft section 41 and by the internal splines of the gear 46, and said second supporting connection is circumferentially fixed to prevent rotation of the gear 46 relative to the shaft 37, or in other words, to afford driving engagement of the radially enlarged shaft section 41 with the gear 46.

The gear 46, as stated, is axially movable into and out of mesh with the gear 27, and Fig. 1 shows the gear 46 in a neutral position from which it may be moved into mesh with the gear 27, a collar on the gear 46 being engaged by a shifter fork 48 shown in Fig. 2. A circumferential portion of the gear 46 of an axial width equal to the tooth width of the gear 27 has teeth of full height adapted to mesh with the teeth of the gear 27, and each tooth of the gear 46 is extended axially towards the gear 47 and reduced in height to form a circumferential series of external clutch teeth on the gear 46. At the side of the gear 47 opposite to the gear 46 a circumferential series of internal clutch teeth 61 (Fig. 3) are formed on the gear 47, and the clutch teeth of the gear 47 may be engaged with the clutch teeth of the gear 46 by axial movement of the gear 46 from its neutral position towards the gear 47. The gear 29, as stated, meshes with the gear 47, and clutching engagement of the gear 46 with the gear 47 will establish a first or low speed driving connection between the shaft 37 and the series of drivingly interconnected gears 26, 27, 28, 29 and 31, while meshing engagement of the gear 46 with the gear 27 will establish a second or high speed driving connection between the shaft 37 and the mentioned series of drivingly interconnected gears.

A reverse speed driving connection may be established between the shaft 37 and the series of drivingly interconnected gears, while the gear 46 is in neutral, by means of a gear train comprising a gear 44 on the driven shaft 37 and reverse idlers 62 and 67 which, as shown in Figs. 2 and 5, are splined on a shaft 63 rotatable about an axis spaced radially from the axes of the shafts 22 and 37. The gear 44 has internal splines cooperating with the splines of the radially enlarged shaft section 41 so as to rotate in unison with the shaft 37, and provisions are made for retaining the gear 44 against displacement axially of the shaft 37 from the position in which the gear 44 is shown in Fig. 1. For that purpose an inwardly projecting annular shoulder is formed on the hub of the gear 44 at the end thereof adjacent to the bearing 39, and a short space is left between the inner race of the bearing 39 and the splines of the shaft section 41, for accommodating said annular hub shoulder of the gear 44. Axial contact of the shoulder with the ends of the splines on the shaft 37 limits forward movement of the gear 44 axially of the shaft, and axial contact of the shoulder with the inner race of the bearing 39 limits rearward movement of the gear 44 within the housing 3.

The gear 44 is in constant mesh with the reverse idler 62, and the gear 26 on the splined section of shaft 22 is shiftable axially into and out of mesh with the reverse idler 67 which is rotatable in unison with the reverse idler 62. Meshing engagement of the gear 26 with the reverse idler 67 therefore establishes the mentioned reverse driving connection between the shaft 37 and the series of drivingly interconnected gears 26, 27, 28, 29 and 31.

Upon establishment of any of the various driving connections between the shafts 11 and 37, power transmitted to the shaft 37 is transmitted to a shaft 69 through a gear 68 which meshes with the gear 44 on the shaft 37, and rotation of the shaft 69 is transmitted through a pair of bevel gears 73, 74 and a pair of spur gears 76, 77 to a driving axle 72 of the motor grader.

Referring again to the bearings 38 and 39 for the shaft 37, it should be noted that the construction of these bearings and their mounting on the housing and shaft is such as to permit not only rotation of the shaft relative to the housing but also to secure the shaft in an axially fixed position relative to the housing. The inner race of the rearward bearing 39 abuts axially against the hub shoulder of the gear 44, which in turn abuts axially against the rear ends of the splines of the radially enlarged shaft section 41, while the outer race of the bearing 39 abuts rearwardly against the cover 40. The antifriction bodies of the bearing 39 are arranged, according to accepted practice, in an inclined position between the inner and outer races, to enable the bearing to take up axial thrust in one direction, and the bearing is installed on the housing in such a position that the antifriction bodies will be effective to transmit a rearward axial thrust from the inner to the outer race. The bearing 39, therefore, secures the shaft 37 against axial displacement relative to the housing 3 in a rearward direction, but it is ineffective to secure the shaft against axial displacement in a forward direction. The inner race of the bearing 39 is fitted upon a cylindrical radially reduced stub end of the shaft 37 reasonably tight so that it may be separated therefrom by a moderate axial pressure upon the inner race, and the antifriction bodies are suitably interlocked with the inner race so that the inner race and the antifriction bodies may be moved as an assembled unit axially out of the outer race by axial forward movement of the shaft 37. During such removal of the inner race and of the antifriction bodies the outer race stays on its seat in the rear wall of the housing due to frictional engagement therewith.

The inner race of the forward bearing 38 abuts axially against a shoulder at the forward end of the cylindrical shaft section 42, as shown in Fig. 3, and the outer race abuts axially against a bearing retainer 52 which is secured to the forward housing wall by four cap screws 53, the retainer having an annular portion projecting into the cylindrical opening of the forward housing wall in which the outer race of the bearing 38 is seated, and the front face of the outer race is engaged by a radial surface of said annular portion of the retainer 52. The antifriction bodies of the bearing 38, like the antifriction bodies of the bearing 39, are arranged in an inclined position between the inner and outer races, and the bearing 38 is installed on the housing in such a position that the antifriction bodies will be effective to transmit a forward axial thrust from the inner to the outer race. The bearing 38, therefore, secures the shaft 37 against axial displacement relative to the housing 3 in a forward direction, but it is ineffective to secure the shaft against axial displacement in a rearward direction. The axial spacing between the outer races of the bearings 38 and 39 is so related to the axial spacing of inner races as to insure free rotation of the shaft within the bearings without appreciable axial play, and for purposes of adjustment shims may be interposed between the retainer 52 and the forward wall of the housing 3. A packing 54 seals the gap between the retainer 52 and the shaft 37.

From the foregoing description it will be seen that the shaft 37 is rotatably supported on the housing 3 in an axially fixed position by the bearings 38 and 39, and it will be noted that the bearings are operable, by removal of the retainer 52, to release the shaft for axial movement relative to the housing in a forward direction.

Reference has been made hereinbefore to first and second supporting connections between the shaft 37 and the gears 47 and 46, respectively, the first supporting connection by means of the two series of rollers 49 and 51 having been described as circumferentially loose to permit rotation of the gear 47 relative to the shaft 37, and the second supporting connection by means of the external splines on the shaft 37 and the internal splines of the gear 46 having been described as circumferentially fixed to prevent rotation of the gear 46 relative to the shaft 37. The diameter of the cylindrical axial bore of the gear 47 is somewhat larger than the outside diameter of the radially enlarged splined shaft section 41, and of such size that the splined shaft section may be passed through said bore by endwise movement of the shaft 37. The diameter of the radially reduced cylindrical shaft section 42 is substantially equal to the root diameter of the splined shaft section 41, so that the end faces of the splines will afford the mentioned shoulder on the shaft 37. Axial movement of the cylindrical rollers 49 and 51 relative to the shaft 37 in a rearward direction is limited by contact of the rearward guide ring 45 with the forward ends of the splines on the shaft section 41, and axial movement of the cylindrical rollers 49 and 51 in a forward direction is limited by contact of the forward guide ring 55 with the inner race of the bearing 38. As shown in Fig. 3, the rollers 49 and 51, or the centering means for the gear 47, are axially loose in the bore of the gear 47 for axial movement therefrom towards the bearing opening in the front wall of the housing accommodating the bearing 38, and the cylindrical rollers 49 and 51, while effective to rotatably support the gear 47 on the shaft 37, are ineffective to secure the gear 47 in an axially fixed position on the shaft 37. Removal of the bearing 38 from its opening in the housing 3 releases the shaft 37 for endwise movement towards said opening, and the centering means for the gear 47 comprising the rollers 49 and 51 are axially engageable, upon such endwise movement of the shaft 37, by the forward ends of the splines 41, so that the roller units or centering means for the gear 47 may be removed from the axial bore of said gear by endwise movement of the shaft towards the opening from which the bearing 38 has been removed. The supporting connection between the shaft 37 and the gear 47 is thus axially loose on the gear 47 to permit removal of the shaft 37 from the gear 47 and from the housing 3 by endwise movement of the shaft towards and through the housing opening for the bearing 38 after said bearing has been removed.

The gear 46 is axially shiftable on the splined shaft section 41, as stated hereinbefore, and the second supporting connection is therefore also axially loose, but circumferentially fixed as distinguished from the first supporting connection.

Referring to Figs. 3 and 4, a semiannular plate 56 is mounted in the housing 3 below the hub of the gear 47 by means of three horizontal studs 57 which are supported in three bores, respectively, of the forward wall of the transmission housing, and each stud has a reduced portion extending through the bearing retainer 52. The reduced portions of the studs 57 are threaded, and nuts 58 on the studs are drawn up against the bearing retainer 52 to hold the studs and semiannular plate 56 in an axially fixed position relative to the housing 3. The plate 56 is arranged at the under side of a horizontal axial plane through the hub of the gear 47, and it has a portion projecting radially into an external circumferential groove 59 in the hub of the gear 47. The portion of the plate 56 projecting into the groove 59 is of a thickness slightly less than the axial width of the groove, and it has an arcuate edge within the groove substantially concentric with the gear 47 but slightly spaced from the bottom of the groove. The opposite side surfaces of the portion of the plate 56 projecting into the groove cooperate with the vertical side walls of the latter to secure the gear 47 against axial displacement relative to the housing 3, or in other words, the plate 56 constitutes a thrust transmitting means for limiting axial play of the gear 47 relative to the housing, afforded by the mentioned first supporting connection. The plate or thrust transmitting means is mounted on the housing 3 independently of the shaft 37, and the bearings 38 and 39 for the shaft are mounted on the housing independently of said thrust transmitting means, the arrangement being such that the bearing retainer 52 can be removed in order to release the shaft 37 for axial displacement relative to the housing while the studs 57 remain in their respective bores of the forward housing wall and the plate 56 thus remains supported on the housing.

In order to assemble the transmission, the shaft 37 and the gears 44, 46 and 47 thereon are installed prior to the installation of the shaft 22 and the gears 26, 27, 28, 29 and 31, and also prior to the installation of the brake housing 7 or at least of the forward part of the latter. As one of the first steps for installing the gears 44, 46 and 47, the retainer assembly comprising the plate 56 and the studs 57 which are riveted thereto, as shown in Fig. 3, is moved into the housing 3 through the opening 4, and the studs 57 are inserted from the interior of the housing into their respective bores in the forward housing wall so as to locate the plate 56 substantially in the position in which it is shown in Figs. 1 and 3. The gear 47 is then moved into the housing 3 through the opening 4 and lowered upon the plate 56 so that the plate 56 will enter the groove 59 and the bottom of the groove will come to rest on the upwardly facing arcuate edge of the plate 56. When seated on the plate 56, the gear 47 is held in an upright position against forward and rearward tipping by cooperation of the plate 56 with the side walls of the groove 59, and engagement of the arcuate edge of the plate with the bottom of the groove centers the gear in approximate alinement with the axis of the opening in the forward housing wall for the bearing 38.

As a next step of the assembling process the shaft 37, which is stripped of the rear bearing 39, is moved axially in a rearward direction through the housing opening in which the bearing 38 is later installed, and during such axial movement of the shaft the radially enlarged shaft section 41 passes through the axial opening of the gear 47. After the shaft 37 has been passed through the gear 47 a relatively short distance so as to expose a portion of its splined section 41 at the rear side of the gear 47, the gear 46 is moved into the housing through the opening 4 and slid axially upon the splined shaft section projecting rearwardly from the gear 47. Thereafter, the gear 44 is moved into the housing through the opening 4 and slid upon the exposed end of the shaft 37, and the inner race of the rear bearing 39 is then started on the reduced stub end of the shaft. The antifriction bodies of the rear bearing 39 are suitably interlocked, as stated, with the inner race and they are installed as a unit with the latter on the shaft. The outer race of the rear bearing 39, which has been driven into its opening in the rear wall of the housing, may then be engaged with the antifriction bodies on the shaft 37 by continued rearward movement of the shaft 37, and moderate axial pressure on the shaft in a rearward direction will cause the stub end of the shaft to fully enter the inner race of the rear bearing 39, and axial play of the gear 44 will be taken up by contact of the hub shoulder of said gear with the inner race of the rear bearing 39 and with the adjacent ends of the splines of the shaft section 41.

After the shaft 37 has been fully inserted into the housing in the described manner the roller unit comprising the cylindrical rollers 49 and guide rings 45 is slid over the shaft 37 from its forward end in a rearward direction through the housing opening for the bearing 38 and into the cylindrical axial bore of the gear 47, and the roller unit comprising the cylindrical rollers 51 and guide rings 55 is likewise slid into the cylindrical axial bore of the gear 47, whereby the latter and the shaft will be centered relative to each other.

The installation of the shaft 37 on the housing 3 is completed by sliding the inner race and the antifriction bodies of the forward bearing 38 upon the shaft, and by sliding the outer race of said bearing into its opening in the front wall of the housing, and by bolting the bearing retainer 52 to the front wall of the housing. When the shaft 37 becomes centered in the opening for the bearing 38 by installation of the latter, the shaft 37 moves up a short distance so as to lift the gear 47 out of load bearing contact with the upwardly facing arcuate edge of the plate 56, and such upward movement of the gear 47 separates the bottom of the groove 59 from the arcuate edge of the plate 56 a distance which is only a small fraction of the depth of the groove, so that a substantial portion of the plate 56 will remain within the groove. The nuts 58 on the studs 57 are applied after the bearing retainer 52 has been secured in place by the bolts 53, and by tightening the nuts 58, the retainer assembly comprising the plate 56 and studs 57 is secured against axial displacement relative to the housing 3.

It will be noted that the first and second supporting connections between the shaft 37 and the gears 47 and 46, respectively, by being axially loose as explained hereinbefore, permit the mentioned axial insertion of the shaft 37 through the housing opening for the bearing 38 and through the cylindrical and broached openings, respectively, of the gears 47 and 46 for purposes of assembly. On the other hand, the mentioned first and second supporting connections, by being axially loose, permit axial withdrawal of the shaft 37 from the broached and cylindrical openings of the gears 46 and 47, respectively, and from the housing opening for the bearing 38, for the purpose of disassembling the transmission.

From the foregoing description of the procedure for installing the shaft 37 and the gears 44, 46 and 47 it will be apparent that the shaft and the mentioned gears thereon may be removed from the housing, after removal of the brake housing 7 or at least its forward portion, by substantially following said procedure in reverse order. That is, the bearing retainer 52 is first removed in order to release the shaft 37 for axial movement in a forward direction, and by exerting an axial forward pull on the shaft, the bearing 38 will be pushed out of the front wall of the housing, and the roller units comprising the cylindrical rollers 49, 51 and the guide rings 45, 55 will be pushed out of the cylindrical axial bore of the gear 47, and through the housing opening for the bearing 38, as has been mentioned hereinbefore. During such axial forward movement of the shaft, the splined section 41 moves into the axial bore of the gear 47, and the rear end of the shaft together with the inner race and the antifriction bodies of the rear bearing 39 move out of the outer race of the latter bearing. Assuming that the gears 26, 27, 28, 29 and 31 have been removed from the housing before the shaft 37 is moved forwardly, and that there is no obstruction in the housing 3 to prevent the gear 44 from being moved, by axial forward movement of the shaft 37, against the collar at the rear side of the gear 46, continued forward movement of the shaft 37 will be transmitted through the inner race of the rear bearing 39, which is frictionally retained on the stub end of the shaft 37, as stated, to the gear 44, and the latter, upon axial engagement with the collar of the gear 46, will move the gear 46 against the gear 47, and as a result the hub of the gear 47 will be moved against the front wall of the housing 3, such movement of the gear 47 being permitted by sliding movement of the studs 57 in the front wall of the housing 3. A condition will thus be established which will permit separation of the inner race of the rear bearing 39 from the stub end of the shaft 37 by exerting a sufficiently strong pull on the shaft 37 in a forward direction to push the inner race of the rear bearing 39 from the stub end of the shaft. The shaft may then be fully withdrawn from the housing 3 through the opening for the forward bearing 38, whereupon the gears 44, 46 and 47 may be readily removed from the housing through the opening 4.

It will be noted that the gear 47 is the largest gear of the transmission, and that the plate 56 and the studs 57 afford an auxiliary support to sustain the relatively heavy weight of this gear during the withdrawal of the shaft 37. After withdrawal of the shaft 37 the gear 47 is sustained by the plate 56 and studs 57 in substantially the same position relative to the housing in which it is sustained in the assembled transmission, on the shaft 37 by the roller units 49, 45 and 51, 55. The gear 47 may readily be placed on the plate 56, as mentioned hereinbefore, preparatory to insertion of the shaft, and it may likewise readily be removed from the plate after withdrawal of the shaft 37.

The cover 6 for the housing opening 4 serves as a support for a pair of axially slidable selector shafts which form part of a shift mechanism for the shifter forks 19, 21, 32 and 48 mentioned hereinbefore. The shifter forks are secured, respectively, to shifter shafts 78, 79, 81 and 82 which are mounted on the housing 3 for axial sliding movement relative thereto. The shifter shafts 78 and 79 are selectively engageable by an arm 93 on the selector shaft 91, and the shifter shafts 81 and 82 are selectively engageable by an arm 94 on the selector shaft 92. By means of a suitable operating mechanism, not shown, the selector shafts may be moved to effect the desired movements of the shifter forks 19, 21, 32 and 48 for establishing various driving connections between the drive shaft 11 and the driven shaft 37. Provisions are made, as usual, for locking the shifter shafts 78, 79, 81 and 82 in their neutral and drive establishing positions by means of resilient catches, one of which is shown at 83 in Fig. 6 for the shifter shaft 81. An interlock mechanism 84 shown in Fig. 6 for the shifter shafts 81 and 82 operates to lock either of these shafts in its neutral position when the other is moved into a drive establishing position, and a similar interlock mechanism is provided for the shifter shafts 78, 79.

The cover 6 and the selector shafts 91 and 92, together with the arms 93 and 94, form a unit which may be readily installed on and removed from the housing 3 for purposes of assembling and disassembling the transmission, and the shifter shafts 78, 79, 81 and 82, together with the shifter forks 19, 21, 32 and 48, are preferably installed after the shaft 37 and the gears 44, 46 and 47 have been installed in the manner described hereinbefore. Likewise, for purposes of disassembly, the shifter shafts 78, 79, 81 and 82, together with the shifter forks 19, 21, 32 and 48, are preferably removed before the shaft 37 and the gears 44, 46 and 47 are removed from the housing in the manner explained hereinbefore.

While in the foregoing a preferred embodiment of the invention has been disclosed, it should be understood that it is not intended to limit the invention to the exact details of construction herein shown and described for various modifications within the scope of the appended claims may occur to persons skilled in the art.

It is claimed and desired to secure by Letters Patent:

1. In a power transmitting mechanism, a housing having a bearing opening, a shaft movable endwise into said housing through said bearing opening and having a shoulder within said housing between a portion thereof adjacent to said bearing opening and a radially enlarged portion remote from said bearing opening, a rotary power transmitting element within said housing having an axial bore of such size that said radially enlarged shaft portion may be passed through said bore by endwise movement of said shaft, supporting means between said power transmitting element and the portion of said shaft adjacent to said bearing opening, axially loose on said power transmitting element to permit removal of said shaft from said power transmitting element and from said housing by endwise movement of said shaft through said bearing opening, means including a bearing detachably mounted in said bearing opening for rotatably supporting said shaft on said housing, and thrust transmitting means mounted on said housing independently of said shaft and independently of said bearing and cooperating with said power transmitting element to limit axial play thereof relative to said housing.

2. In a power transmitting mechanism, a housing having a bearing opening, a shaft movable endwise into said housing through said bearing opening and having a shoulder within said housing between a portion thereof adjacent to said bearing opening and a radially enlarged portion remote from said bearing opening, a rotary power transmitting element within said housing having an axial bore of such size that said radially enlarged shaft portion may be passed through said bore by endwise movement of said shaft, supporting means between said power transmitting element and the portion of said shaft adjacent to said bearing opening, axially loose on said power transmitting element to permit removal of said shaft from said power transmitting element and from said housing by endwise movement of said shaft through said bearing opening, means including a bearing detachably mounted in said bearing opening for rotatably supporting said shaft on said housing, and thrust transmitting means mounted on said housing independently of said shaft and independently of said bearing and cooperating with said power transmitting element to limit axial play thereof relative to said housing, said thrust transmitting means including an element adapted to sustain said power transmitting element, after removal of said shaft from said housing, in substantially the same position relative to said housing, in which it is sustained on said shaft by said axially loose supporting means.

3. In a power transmitting mechanism, a housing having a bearing opening and a side opening affording access to the interior of said housing independently of said bearing opening, a rotary power transmitting element having an axial bore adapted to be alined with said bearing opening upon movement of said element into said housing through said side opening, a shaft extending through said bore of said rotary element, telescopically mounted at one side of the latter on said housing and extending, at the other side of said rotary element through said bearing opening, said shaft having a radially enlarged portion at said one side of said rotary element adapted to pass through said bore and being devoid of means, at said one side of said rotary element, obstructing axial withdrawal of said shaft through said bore towards the other side of said rotary element, bearing means within said bearing opening rotatably supporting said shaft on said housing and removable therefrom to permit said axial withdrawal of said shaft, other bearing means surrounding a portion of said shaft between said radially enlarged portion thereof and said bearing opening, cooperating with said rotary element to rotatably support the latter on said shaft, said other bearing means being axially loose within said bore to permit said axial withdrawal of said shaft, and thrust transmitting means mounted on said housing independently of said shaft and bearing means, and cooperating with said rotary element to limit axial play thereof relative to said housing.

4. In a power transmitting mechanism, a housing having a bearing opening and a side opening affording access to the interior of said housing independently of said bearing opening, a rotary power transmitting element having a cylindrical axial bore adapted to be alined with said bearing opening upon movement of said element into said housing through said side opening, a shaft extending through said bore of said rotary element, telescopically mounted at one side of the latter on said housing and extending, at the other side of said rotary element through said bearing opening, said shaft having a cylindrical portion within said bore and a radially enlarged portion at said one side of said rotary element adapted to pass through said bore, and being devoid of means, at said one side of said rotary element, obstructing axial withdrawal of said shaft through said bore towards the other side of said rotary element, bearing means within said bearing opening rotatably supporting said shaft on said housing and removable therefrom to permit said axial withdrawal of said shaft, a series of cylindrical rollers cooperating directly with the axial surfaces of said cylindrical shaft portion and of said bore to rotatably support said rotary element on said shaft, said cylindrical rollers being movable axially out of said bore upon said axial withdrawal of said shaft, and thrust transmitting means mounted on said housing independently of said shaft and bearing means and cooperating with said rotary element to limit axial play thereof relative to said housing.

5. In a power transmitting mechanism, a housing having a bearing opening in a vertical wall portion thereof, and a side opening affording access to the interior of said housing independently of said bearing opening, a rotary power transmitting element having a hub portion and an axial bore therethrough adapted to be alined with said bearing opening upon movement of said rotary element into said housing through said side opening, a plate member having a downwardly recessed top edge, mounted on said housing at the inner side of said wall portion, said hub portion having an external circumferential groove into which said top edge of said plate member projects when said bore is alined with said bearing opening, and means independent of said plate member, for supporting said rotary element within said housing, said means comprising a shaft extending through said bore and having a radially enlarged portion at the side of said rotary element, remote from said wall portion, adapted to pass through said bore and bearing opening, means including a bearing detachably mounted within said bearing opening, rotatably supporting said shaft on said housing, and another bearing surrounding a portion of said shaft between said radially enlarged portion thereof and said wall portion for rotatably supporting said rotary element on said shaft, said last mentioned bearing being axially loose on said rotary element and adapted to pass through said bearing opening, whereby said shaft may be withdrawn axially from said rotary element and housing by endwise movement of said shaft through said bearing opening upon removal of said first mentioned bearing therefrom.

LOUIS JACOBI.